United States Patent [19]

Johnson

[11] Patent Number: 5,313,023
[45] Date of Patent: May 17, 1994

[54] LOAD CELL

[75] Inventor: Thomas H. Johnson, Winnebago, Minn.

[73] Assignee: Weigh-Tronix, Inc., Fairmont, Minn.

[21] Appl. No.: 863,162

[22] Filed: Apr. 3, 1992

[51] Int. Cl.$^5$ ............ G01G 3/08; G01G 3/14; G01L 1/10; G01L 1/22
[52] U.S. Cl. ............ 177/229; 177/210 FP; 73/862.59; 73/862.627
[58] Field of Search ............ 177/229, 210 FP; 73/862.59, 862.627

[56] References Cited

U.S. PATENT DOCUMENTS

| | | |
|---|---|---|
| D. 256,342 | 8/1980 | Gard . |
| D. 256,343 | 8/1980 | Gard . |
| D. 275,558 | 9/1984 | Pearson . |
| 3,140,450 | 7/1964 | Tavis . |
| 3,238,789 | 3/1966 | Erdley . |
| 3,269,192 | 8/1966 | Southworth, Jr. et al. . |
| 3,274,828 | 9/1966 | Pulvari . |
| 3,332,560 | 7/1967 | Bradfield . |
| 3,343,090 | 3/1969 | Chelner . |
| 3,366,191 | 1/1968 | Reid et al. . |
| 3,399,572 | 9/1968 | Riordan et al. . |
| 3,404,744 | 10/1968 | Williams . |
| 3,413,859 | 12/1968 | Riordan . |
| 3,440,888 | 4/1969 | Southworth, Jr. et al. . |
| 3,465,597 | 9/1969 | Riordan et al. . |
| 3,470,400 | 9/1969 | Weisbord . |
| 3,479,536 | 11/1969 | Norris . |
| 3,486,383 | 12/1969 | Riordan . |
| 3,505,866 | 4/1970 | Weisbord et al. . |
| 3,513,356 | 5/1970 | Newell . |
| 3,529,470 | 9/1970 | Agar . |
| 3,541,849 | 11/1970 | Corbett . |
| 3,552,511 | 1/1971 | Marcheso et al. . |
| 3,557,891 | 1/1971 | Klopfenstein . |
| 3,604,525 | 9/1971 | Blethen et al. . |
| 3,621,713 | 11/1971 | Wirth et al. . |
| 3,684,875 | 8/1972 | Smith et al. . |
| 3,685,604 | 8/1972 | Smith et al. . |
| 3,712,395 | 1/1973 | Streater et al. . |
| 3,716,706 | 2/1973 | Gray . |
| 3,724,572 | 4/1973 | Saner . |
| 3,742,418 | 6/1973 | Randolph, Jr. . |
| 3,786,884 | 1/1974 | Allenspach . |
| 3,788,410 | 1/1974 | Allenspach et al. . |
| 3,789,937 | 2/1974 | Strobel et al. . |
| 3,826,931 | 7/1974 | Hammond . |
| 3,863,497 | 2/1975 | Van de Vaart et al. . |
| 3,869,004 | 3/1975 | Gallo . |
| 3,885,427 | 5/1975 | Melcher et al. . |
| 3,897,681 | 8/1975 | Meier . |
| 3,902,374 | 9/1975 | Hoffman et al. . |
| 3,915,248 | 10/1975 | Paelian . |
| 3,951,221 | 4/1976 | Rock . |
| 3,963,082 | 6/1976 | Meier . |
| 3,969,640 | 7/1976 | Staudte . |
| 3,991,840 | 11/1976 | Rawcliffe . |
| 3,998,104 | 12/1976 | Albert . |
| 4,014,397 | 3/1977 | Langevin . |
| 4,020,686 | 5/1977 | Brendel . |

(List continued on next page.)

FOREIGN PATENT DOCUMENTS 0016238  3/1979  European Pat. Off. .
0096653  12/1983 European Pat. Off. .

(List continued on next page.)

OTHER PUBLICATIONS

W. C. Albert et al., "Vibrating Beam Accerelometer for Strapdown Applications", *IEEE 1982 Position Location and Navigation Symposium*, 319-322 (1982).

(List continued on next page.)

*Primary Examiner*—George H. Miller, Jr.
*Attorney, Agent, or Firm*—Merchant, Gould, Smith, Edell, Welter & Schmidt

[57] ABSTRACT

The invention is a load cell for the measurement of force, independent of displacement, created by means such as weight, acceleration, pressure, and the like. The load cell has a beam structure with beams positioned parallel to each other in at least one plane. Generally, these parallel beams are attached to a stationary substrate and have sensing means attached between the two beams. In operation, deflection of one beam creates a response in the sensing means due to the relative action or deflection in the second beam.

28 Claims, 3 Drawing Sheets

U.S. PATENT DOCUMENTS

| | | | |
|---|---|---|---|
| 4,026,158 | 5/1977 | Albert . | |
| 4,039,969 | 8/1977 | Martin . | |
| 4,041,289 | 8/1977 | Brosh et al. . | |
| 4,043,190 | 8/1977 | Gallo . | |
| 4,064,744 | 12/1977 | Kistler . | |
| 4,075,887 | 2/1978 | Gallo . | |
| 4,088,014 | 5/1978 | Wirth et al. . | |
| 4,089,058 | 5/1978 | Murdock . | |
| 4,089,217 | 5/1978 | Rahav et al. . | |
| 4,104,920 | 8/1978 | Albert et al. | 73/517 |
| 4,107,985 | 8/1978 | Sommer . | |
| 4,109,534 | 8/1978 | Albert . | |
| 4,139,070 | 2/1979 | Hanson et al. . | |
| 4,143,727 | 3/1979 | Jacobson . | |
| 4,144,747 | 3/1979 | Datwyler, Jr. . | |
| 4,167,686 | 9/1979 | Fukuyo . | |
| 4,170,270 | 10/1979 | Sette et al. . | |
| 4,179,004 | 12/1979 | Ebbinge . | |
| 4,181,011 | 1/1980 | Brendel . | |
| 4,196,784 | 4/1980 | Suzuki et al. . | |
| 4,215,570 | 8/1980 | Eer Nisse . | |
| 4,219,089 | 8/1980 | Gard et al. . | |
| 4,221,131 | 9/1980 | Albert | 73/517 |
| 4,237,988 | 12/1980 | Blawert et al. . | |
| 4,239,088 | 12/1980 | Check et al. . | |
| 4,262,193 | 4/1981 | Ozawa . | |
| 4,297,872 | 11/1981 | Ikeda et al. . | |
| 4,299,122 | 11/1981 | Ueda et al. . | |
| 4,300,648 | 11/1981 | Gallo et al. . | |
| 4,321,500 | 3/1982 | Paros et al. . | |
| 4,338,825 | 7/1982 | Amlani et al. . | |
| 4,350,918 | 9/1982 | Sato . | |
| 4,362,961 | 12/1982 | Gerber . | |
| 4,372,173 | 2/1983 | Eer Nisse et al. . | |
| 4,375,243 | 3/1983 | Doll . | |
| 4,377,765 | 3/1983 | Kogure et al. . | |
| 4,384,495 | 5/1983 | Paros | 73/862.59 |
| 4,386,535 | 6/1983 | Albert . | |
| 4,406,966 | 9/1983 | Paros | 310/321 |
| 4,415,827 | 11/1983 | Chuang . | |
| 4,429,248 | 1/1984 | Chuang . | |
| 4,430,894 | 2/1984 | Albert et al. . | |
| 4,435,666 | 3/1984 | Fukui et al. | 310/328 |
| 4,445,065 | 4/1984 | Albert . | |
| 4,446,394 | 5/1984 | Albert . | |
| 4,447,853 | 5/1984 | Tomuro et al. . | |
| 4,448,546 | 5/1984 | Paros . | |
| 4,454,770 | 6/1984 | Kistler . | |
| 4,459,042 | 7/1984 | Paros . | |
| 4,467,651 | 8/1984 | Peters et al. . | |
| 4,469,979 | 9/1984 | Chuang . | |
| 4,479,385 | 10/1984 | Koehler . | |
| 4,479,391 | 10/1984 | Banik et al. | 73/862.59 |
| 4,493,384 | 1/1985 | Yano et al. . | |
| 4,497,386 | 2/1985 | Meier . | |
| 4,526,247 | 7/1985 | Eer Nisse et al. . | |
| 4,535,638 | 8/1985 | Eer Nisse et al. . | |
| 4,538,461 | 9/1985 | Juptner et al. . | |
| 4,544,858 | 10/1985 | Nishiguchi et al. | 310/321 |
| 4,587,853 | 5/1986 | Komoto et al. | 73/862.59 |
| 4,592,663 | 6/1986 | EerNisse et al. . | |
| 4,598,781 | 7/1986 | Tramposch . | |
| 4,614,245 | 9/1986 | Yamanaka | 177/210 FP |
| 4,623,813 | 11/1986 | Naito et al. . | |
| 4,629,016 | 12/1986 | Knothe et al. . | |
| 4,656,383 | 4/1987 | Albert . | |
| 4,658,174 | 4/1987 | Albert . | |
| 4,658,175 | 4/1987 | Albert . | |
| 4,669,320 | 6/1987 | Simonsen . | |
| 4,685,525 | 8/1987 | Knothe et al. . | |
| 4,710,668 | 12/1987 | Fima et al. . | |
| 4,718,275 | 1/1988 | Norling . | |
| 4,724,351 | 2/1988 | EerNisse et al. . | |
| 4,727,752 | 3/1988 | Peters | 73/517 AV |
| 4,743,790 | 5/1988 | Albert . | |
| 4,750,363 | 6/1988 | Norling . | |
| 4,751,849 | 6/1988 | Paros et al. . | |
| 4,766,768 | 8/1988 | Norling et al. . | |
| 4,782,456 | 11/1988 | Poussier et al. . | |
| 4,785,215 | 11/1988 | Blech . | |
| 4,804,875 | 2/1989 | Albert | 310/323 |
| 4,838,369 | 6/1989 | Albert | 177/210 |
| 4,872,343 | 10/1989 | Peters et al. | 73/517 AV |
| 4,879,914 | 11/1989 | Norling . | |
| 4,891,982 | 1/1990 | Norling . | |
| 4,912,990 | 4/1990 | Norling . | |
| 4,929,860 | 5/1990 | Hulsing, II et al. . | |
| 4,947,694 | 8/1990 | Kirman et al. | 177/210 FP |
| 4,970,903 | 11/1990 | Hanson . | |
| 4,980,598 | 12/1990 | Albert . | |
| 5,005,413 | 4/1991 | Novack et al. . | |
| 5,036,715 | 8/1991 | Hanson . | |
| 5,109,175 | 4/1992 | Albert . | |
| 5,113,698 | 5/1992 | Grlj et al. . | |

FOREIGN PATENT DOCUMENTS

| | | |
|---|---|---|
| 0167055 | 1/1986 | European Pat. Off. . |
| 3336250 | 4/1984 | Fed. Rep. of Germany . |
| 556621 | 3/1971 | Switzerland . |
| 559136 | 8/1977 | U.S.S.R. . |
| 1379670 | 3/1971 | United Kingdom . |
| 1322871 | 7/1973 | United Kingdom . |
| 2057149 | 3/1981 | United Kingdom . |

OTHER PUBLICATIONS

S. S. Chuang, "Force Sensor Using Double-Ended Tuning Fork Quartz Crystals", *Proceedings of the 37th Symposium on Frequency Control* 248:254 (1983).

W. C. Albert, "Forcing Sensing Using Quartz Crystal Flexture Resonators" *Proceedings on the 38th Annual Frequency Control Symposium* 233:239 (1984).

T. Ueda et al., *Measurement* 3(2):89–94 (1985).

W. J. Kass et al., "Double-Ended Tuning Fork Quartz Accerelometer", *Proceedings of the 40th Annual Frequency Control Symposium,* 230–236 (1986).

L. D. Clayton et al., *IEEE Transactions on Ultrasonics, Ferroelectrics, and Frequency Control* UFFC-34(2):243–252 (1987).

B. L. Norling, *Navigation: Journal of the Institute of Navigation* 34(4):337–353 (1987–1988).

W. C. Albert, "A Low Cost Forcing Sensing Crystal Resonator Applied to Weighing", *Proceedings of the 42nd Annual Frequency Control Symposium* 78–84 (1988).

E. D. Reedy, Jr. et al., "Finite-Element Analysis of a Quartz Digital Accerelometer", *IEEE Transactions on Ultrasonics, Ferroelectrics, and Frequency Control,* 37(5):464–474 (1990).

E. P. EarNisse et al., *Sensors* 40–42 Aug. (1992).

Micro Crystal Literature, "Quartz Force Transducer Double-Ended Tuning Fork" (Nov. 1986).

Measurements Group, Inc. Literature, "Tech Note TN-507, Wheatstone Bridge Nonlinearity, Errors Due to Wheatstone Bridge Nonlinearity" (1982).

Weigh-Tronix, Model 8230 Counting Scale Spec Sheet (1991).

Weigh-Tronix, Model 8250 Counting Scale Spec Sheet (1991).

Weigh-Tronix, Model PC-800 Counting Scale Spec Sheet (1992).

LOAD CELL

FIELD OF THE INVENTION

The invention relates to a load cell for the measurement of force. More specifically, the invention relates to a load cell for the measurement of force resulting in strain or stress created by means such as, for example, force, acceleration, or pressure converting the force into an electronic signal transmitted to a point of computation or evaluation. The device resists environmental interferences such as those created by variations in age, temperature and humidity which may ultimately affect modulus, hysteresis, or anelastic material properties.

BACKGROUND OF THE INVENTION

Load measuring devices and cells are known in the art. For example, Gallo, U.S. Pat. No. 4,043,190, discloses a meter for measuring mass or force wherein the sensed displacement acts indirectly on the tension of the two transversely vibrating electrically excited strings. Sette et al, U.S. Pat. No. 4,170,270, discloses an apparatus for preventing the overload of a load cell used to measure deflection. Blawert et al, U.S. Pat. No. 4,237,988, similarly disclose an overload protection device for precision scales. Paros, U.S. Pat. No. 4,384,495, discloses a mounting structure for double bar resonators to ensure symmetrical loading of the resonator responsive to external forces.

Further, Streater et al, U.S. Pat. No. 3,712,395, disclose a weight sensing cell which includes two differentially loaded vibrating members. Suzuki et al, U.S. Pat. No. 4,196,784, disclose a weighing scale having an interior load cell. Great Britain Patent No. 1,322,871 discloses a force measuring apparatus having a pretension string which is excited to a state of transverse oscillation by an electronic circuit. Gallo, U.S. Pat. No. 4,300,648, also discloses a meter for sensing mass and force comprising two flat springs lying in a parallel plane. Pulvari, U.S. Pat. No. 3,274,828, discloses a force sensor based on piezoelectric oscillators.

Also, Reid et al, U.S. Pat. No. 3,366,191, disclose a weighing apparatus which relies on a bridge circuit. Norris, U.S. Pat. No. 3,479,536, discloses a piezoelectric force transducer which is a piezoelectric vibratory beam mounted to receive compressive and tensile forces along its length. Agar, U.S. Pat. No. 3,529,470, discloses a force transducer having a composite strut with two bars which are to be maintained in transverse vibration at a common resonance frequency by electrical feedback wherein the frequency of vibration indicates the force applied to the composite strut. Corbett, U.S. Pat. No. 3,541,849, discloses an oscillating crystal force transducer. Wirth et al, U.S. Pat. No. 3,621,713, disclose an instrument for measuring masses and forces which when stressed by a load shows variation in frequency.

Saner, U.S. Pat. No. 3,724,572, Van de Vaart et al, U.S. Pat. No. 3,853,497, Melcher et al, U.S. Pat. No. 3,885,427, and Paelian, U.S. Pat. No. 3,915,248, all disclose a weighing system which functions by force or weight being transmitted to frequency sensitive elements. Meier, U.S. Pat. No. 3,963,082, Wirth et al, U.S. Pat. No. 4,088,014, Jacobson, U.S. Pat. No. 4,143,727, Ebbinge, U.S. Pat. No. 4,179,004, all disclose force sensing load cell.

Finally, Eer Nisse, U.S. Pat. No. 4,215,570, discloses a miniature quartz resonator force transducer having the shape of a double ended tuning fork. Check et al, U.S. Pat. No. 4,239,088, disclose a scale with weight-to-period transducer which provides an oscillating output, the period of which varies as a function of the weight to be measured. Ueda et al, U.S. Pat. No. 4,299,122, disclose a force transducer based on a vibrator having a pair of plate-shaped vibrating pieces parallel with each other. Paros et al, U.S. Pat. No. 4,321,500, disclose a longitudinal isolation system. Eer Nisse et al, U.S. Pat. No. 4,372,173, disclose a resonator force transducer which includes a pair of elongate generally parallel bars coupled at their ends with a double ended tuning fork arrangement.

Recently, quartz double-ended tuning forks have been used as force sensors in environments where the tension resisted the movement of the loaded structure, or the tension was produced by strain within the loaded structure. Levered systems and parallel guiding structures have been used where the force applied to the force sensing crystal was a fraction of applied load. The force sensing crystal was generally small since the force required to cause adequate frequency change in the resonant double-ended quartz tuning fork did not need to be great.

However, the loaded structure had to be massive to resist effects of undesirable lateral deflection. The flexing portions of these structures which acted as parallel bending beams or bending fulcrums carried some load since the force sensing crystal and its bonded joints deflected when tension was applied to the crystal.

The prior art load cells were dependent on the stability of the loaded structure and the bonding joints, over temperature and time, for output stability. For example, Albert, U.S. Pat. No. 4,838,369 discloses a load cell intended to provide a linear relationship between the signal generated and the force sensed. Albert uses a specific crystal design attached by screws to the frame of the load cell which creates a frictional joint resulting in inadequate zero return and cell precision. Albert relies on a longitudinally rigid structure to resist interferences from varying load positions. The load cell of Albert is designed so that force expended on the load cell, when stressed, results in work or energy loss within the screw joints. In turn, this phenomenon results in poor zero return and precision.

Without attention to material similarly, non-strain sensitive designs, and reduction or cancellation of creep and hysteresis, Albert cannot provide a load cell which truly negates material and temperature effects.

Generally, material aging in these apparatus often caused long term performance to suffer after calibration. Further, these apparatus were limited in resolution by the degree in which anelastic creep and strain hysteresis were compensated for in their design. The quartz crystal bonding joints would often compensate for creep and hysteresis caused by the loaded structure with their own counteracting creep and hysteresis. When the quartz crystals were bonded using adhesives such as epoxies, stresses were introduced in the glue joints and crystal because of differential expansion between the substrate an the quartz and epoxy shrinkage during curing.

Further, as these stresses relaxed over time, the characteristics of the bonded joint changed because of the nonlinear stress-strain curve of the adhesive. This caused the load cell to have excessive zero and span shift over time until the glue joint stresses had relaxed. Differential expansion between the quartz and the structural material would cause the force sensor to have an output due to the temperature as well as applied load.

As a result, a need exists for a load cell which can compensate for changes in modulus of elasticity, anelastic creep, and strain hysteresis occurring in the elements of the cell due to stresses created by the environment of application.

SUMMARY OF THE INVENTION

In accordance with the invention, there, is provided a force sensing load cell comprising a base, a load bearing element affixed to the base, means for supporting capacity affixed to the base and spaced apart from, and parallel in at least one plane to the load bearing element, and means for sensing force, the force sensing means affixed between the load bearing element and the capacity supporting means. The load bearing element functions as a spring. A spring is an element which may store energy through deflection when a force does work on the moveable portion of the spring and which may do work by returning stored energy by providing a force moving through a distance.

In accordance with a further aspect of the invention, there is provided a force sensing load cell comprising a three-dimensional structure having an interior opening defined by an upper wall, a lower wall, and first and second side walls, a base affixed to at least one wall within the interior opening of said three-dimensional structure, a load bearing element affixed to the base, means for supporting capacity affixed to the substrate, and spaced apart from, and parallel in at least one plane, to the load bearing element, and means for sensing force, the force sensing means affixed between the load bearing element in the capacity supporting means. Further embodiments may comprise more than one force sensing means affixed between any number of load bearing elements.

In accordance with another aspect of the invention, there is provided a force sensing load cell comprising a first and second electrical elements for sensing force, a base, and means for structurally supporting the two electrical elements affixed to the base and providing equal magnitude but opposite influence on the first and second electrical elements when the load cell is stressed. Upon stressing the load cell through the incidence of force, independent signal processing occurs of the first and second electrical elements producing a independent mode signal separate from a differential mode signal.

In accordance with one preferred aspect of the invention, there is provided a force sensing load cell comprising a three-dimensional structure having an opening defined by an upper wall, a lower wall and joined by first and second side walls, a substrate positioned within said opening affixed to at least one of the opening walls, a first capacity supporting cantilever beam, said first capacity supporting cantilever beam affixed to said base and extending within the plane of the three-dimensional structural opening, a second parallel capacity supporting cantilever beam, affixed to the base also extending within said three-dimensional structural opening, a load beam affixed to the base intermediate between the first capacity supporting cantilever beam and the second capacity supporting cantilever beam, a first electrical sensor affixed between the first capacity supporting cantilever beam and the load beam, and a second electrical sensor affixed between the load beam and the second capacity supporting cantilever beam. Upon stressing the load cell through the incidence of a force, independent signal processing of the first and second electrical sensors produces a independent mode signal separate from a differential mode signal.

The invention provides a force sensing load cell, which develops output signals highly isolated from unwanted information and from disturbances attributable to variations in the location of the loading forces. The force sensing cell displays reduced anelastic creep and static strain hysteresis effects. The design of the force sensing cell enables the cell to display reduced effects due to temperature on zero, span, and prestress in the assembly at elevated temperature.

Preferably, the structure is machined monolithically from an isotropic metal, therefore, the modulus of elasticity is nearly homogeneous, and the effect of the elastic modulus is nearly cancelled if the crystal-glue system is very stiff relative to the various elements of the cell which are in series with the crystal. This means that the load cell may be machined from any reasonably homogeneous structural material with a fairly well behaved elastic modulus with close to the same performance, if designed within the limitations of the material used.

Anelastic creep, static hysteresis, elastic modulus temperature sensitivity, and return to zero load reading effects on the force applied to the force sensing crystal, all tend to cancel out by the commonality of these effects. For example, if the load cell element resisting the force, as well as influencing the crystal, should have anelastic creep, the output will normally increase over time. However, with the invention, the cell element in series with the crystal also has anelastic creep and will cause the output to decrease, thus cancelling the anelastic creep effect on the force applied to the crystal.

Zero shift is reduced because the spring loaded by the crystal has a large deflection relative to the differential expansion between the quartz and the structural material Zero shift may also be cancelled if a second oppositely loaded crystal is used in the same monolithic structure with a second spring loaded by it which is matched physically to the first, and its output is subtracted from the first crystals output.

Span shift may also be curtailed and almost cancelled because the elastic moduli of both the parallel spring system and the series spring system have very nearly the same sensitivity to temperature, and as the parallel springs deflect more under the applied load, the reactive force in the series spring is reduced.

Aging due to relaxation of elevated temperature cure prestresses is reduced on zero because initial zero shift due to differential expansion between the quartz and the structural material is small, relative to the series spring deflection and its movement due to relaxation is small and may be cancelled as in zero shift over temperature with a second crystal and spring if glue joints are consistent.

Aging is also reduced on span because the deflection under load of the glue joints is very small relative to the deflection of the series spring. Therefore, the elastic modulus change in the glue due to relaxation of the prestress due to the elevated temperature cure, have very little effect.

With regard to loading effects, anelastic creep is reduced because the continued movement over time of the parallel spring loaded by the applied load, is almost cancelled by the relaxation of the reactive force in the series spring due to the isotropic behavior of the spring structures.

Further, static strain hysteresis is reduced because the movement resistance in the parallel and series spring are the same due to their isotropic behavior.

Zero return after load removal is affected in the same way as hysteresis. Span sensitivity to load position is reduced by the principle of the shear induced bending of the parallel spring when loaded toward either end away from the load cell center. Span sensitivity is also reduced because the top and bottom lateral flexures bend easily sideways relative to the horizontal flexured parallelogram elements in the outside structure.

DETAILED DESCRIPTION OF THE PREFERRED EMBODIMENTS

Figure 1:
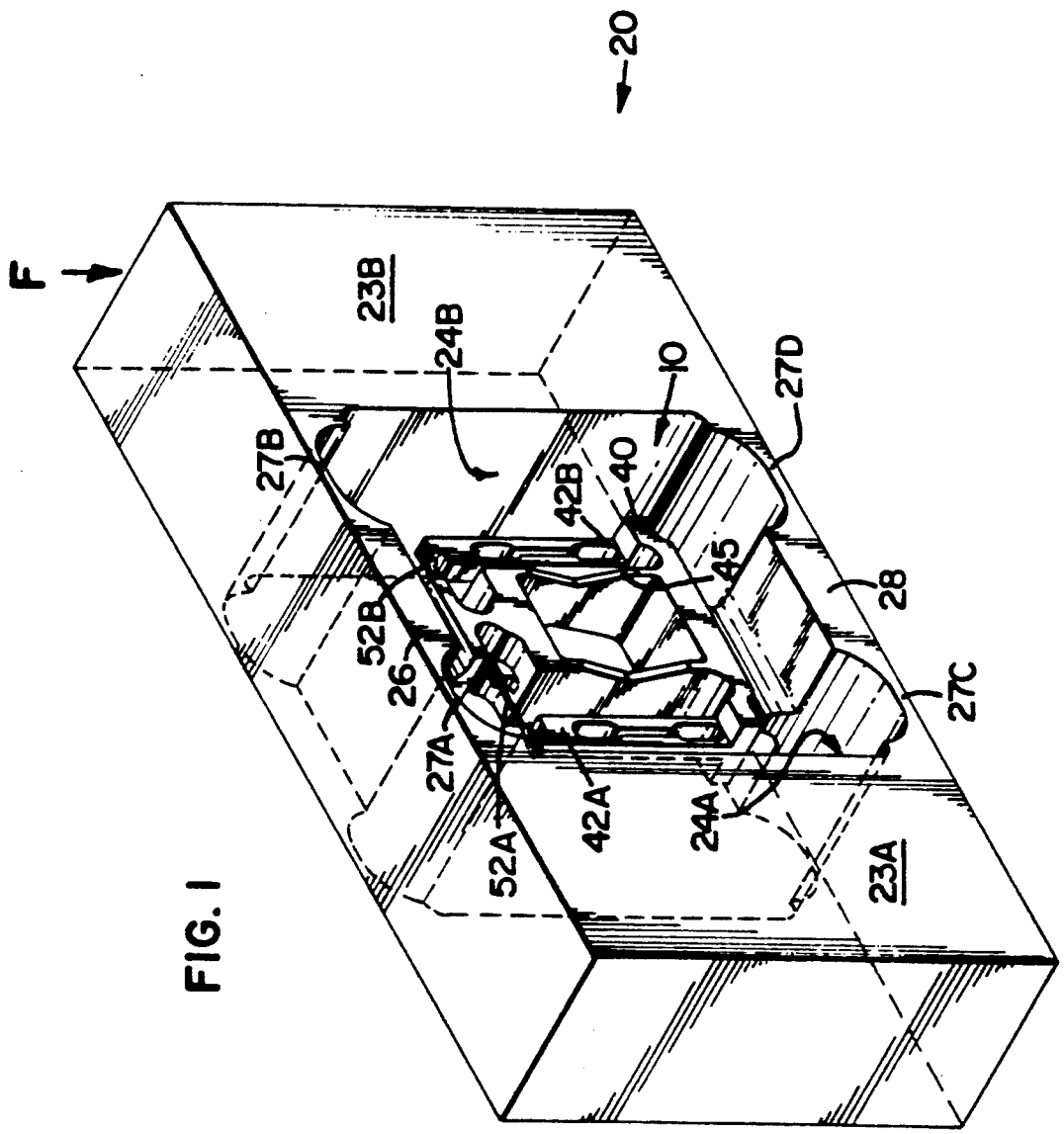
FIG. 1 is a perspective view of a load cell in accordance with one preferred embodiment of the invention.
Figure 2:
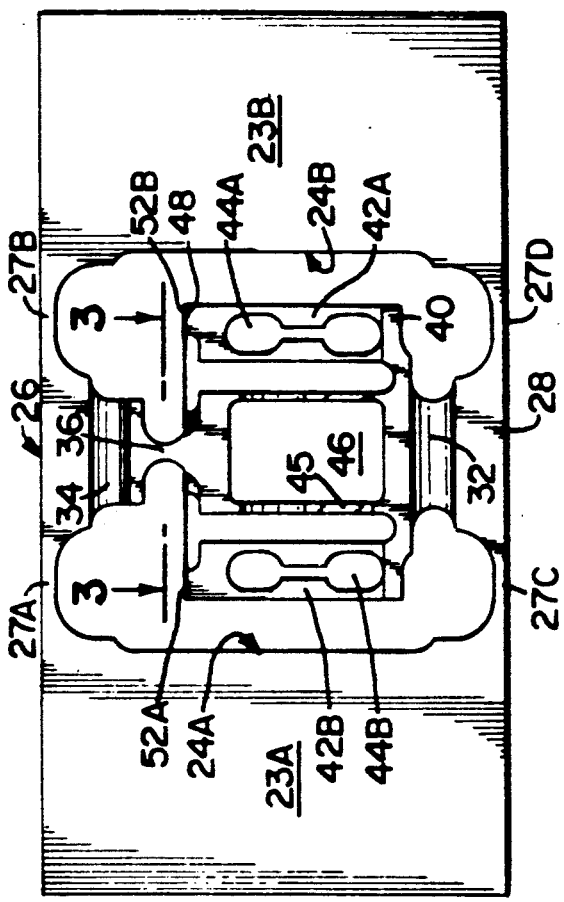
FIG. 2 is a side plan view of the load cell depicted in FIG. 1.
Figure 3:
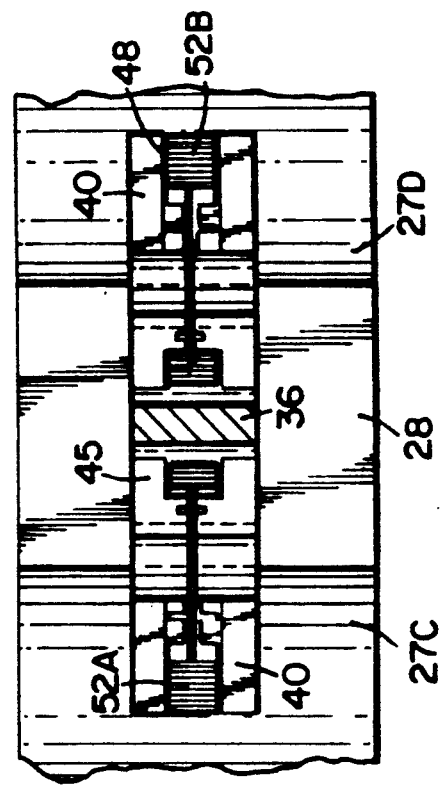
FIG. 3 is a top cut away sectional view of the load cell shown in FIG. 2 taken along lines 3—3.

Turning to the Figures wherein like parts are designated with like numerals throughout several views, there can be seen a force sensing load cell 20 shown in FIG. 1. The load cell may generally comprise a three-dimensional structure having an opening defined by an upper wall 26 and a lower wall 28, joined by first and second side walls, 24A and 24B, respectively. The cell 20 generally comprises a base 40 positioned within the opening 10 and affixed to at least one of the opening walls. Affixed to the base is a first capacity supporting cantilever beam 42A which extends within the plane of said three-dimensional structural opening 10, as well as a second capacity supporting cantilever beam 42B spaced apart from, and parallel to the first capacity supporting cantilever beam 42A. In between the first and second cantilever beams, 42A and 42B, a load beam 45 also is affixed to the base. Two sensors are also affixed to the various beams in this embodiment of the invention. The first sensor is affixed between the first capacity supporting cantilever beam 42A and the load beam 45. The second sensor is affixed between the load beam 45 and the second capacity supporting cantilever beam 42B.

Figure 5:
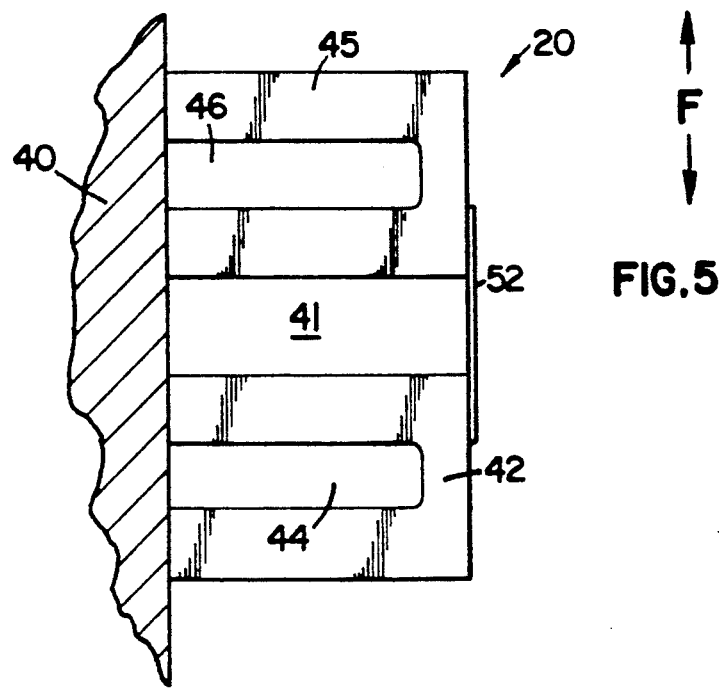
FIG. 5 is a perspective view of a load cell in accordance with a further alternative embodiment of the invention.

Turning to the simplest embodiment of the load cell of the invention, FIG. 5 shows a load cell which generally comprises a base 40 which provides stationary positioning of all elements in the invention. The load cell base 40 may, in accordance with certain embodiments of the invention, provide a base for receiving weight, force or other displacement from the load to be sensed. Among other functions, the base may also function as a platen or other surface for receiving the force which is to be analyzed.

Generally, the base 40 may comprise any number of designs and substances as long as a certain flexibility is provided. The substrate must be capable of deflection so as to transmit forces, sensed by the base, and to displacement of the parallel beams 42 and 45 attached within the base. Through this displacement, the parallel beams ultimately distribute stress and strain to the sensing means suspended between the two parallel beams.

Preferably, the base comprises homogenous and isotropic metal. The load cell is defined as a unitary or monolithic structure wherein the base and parallel beam structure are molded as one continuous unit. This may be done through any number of means including machining, milling, ion cutting, casting or any other means known to those of skill in the art. Preferably, the load cell is stress relived after each milling cycle. Further, in the more preferred embodiments of the invention (FIG. 1), the load cell is preferably machined symmetrically and the spring constants of the beams matched. To this end, the response of the sensing elements should be matched as closely as possible. Further, the load cell may be further milled and stress relieved by stressing the load cell, gauging the response and relieving excess material from the stressed cell to equalize the response.

Preferred compositions include metals such as, for example, elemental metals and metal alloys. Metal compounds including aluminum and its alloys such as 2024-T3, 7075-T6, and 1100; copper and its alloys including ASTM B147, ASTM B145, and ASTM B146; zinc and its alloys including ASTM A40A, and ASTM AC41A, as well as any other metals that are known to provide a light weight structure having good resilience to the forces intended to be sensed by the cell. Most preferably, metals such as aluminum and its oxides are used in forming the load cell of the invention but almost any structural material which lends itself to manufacturability may be used.

The load cell may also be made from polymer systems which provide uniform material characteristics, that is modulus, temperature sensitivity, expansion characteristics, etc. Plastics such as polyamides, polyamideimides, polyvinyl chloride, polyethylene, propylene, polycarbonates, aminoplasts such as melamine resins, cast epoxy resins, cast epoxy resins, cast acrylics, cast fluoroplastics, phenolics, polyacrylonitriles, cast polyurethanes, cast polyesters or polyolefins; synthetic or natural rubber polymers and copolymers such as silicones; ceramics such as silicon dioxide; and cellulosic products; or mixtures of any of these compounds.

The simplest embodiment of this base 40 can be seen in FIG. 5 as a rigid fixture to which a parallel beams 42 and 45 are attached. In an alternative embodiment, FIG. 4, the base 40 may be seen as a mounting plate for positioning of the load bearing means or load beam 45 in capacity support means 42. To this end, the base assists in positioning load beam 45 and cantilever support beam 42 parallel to each other within at least one plane, FIG. 5.

Figure 4:
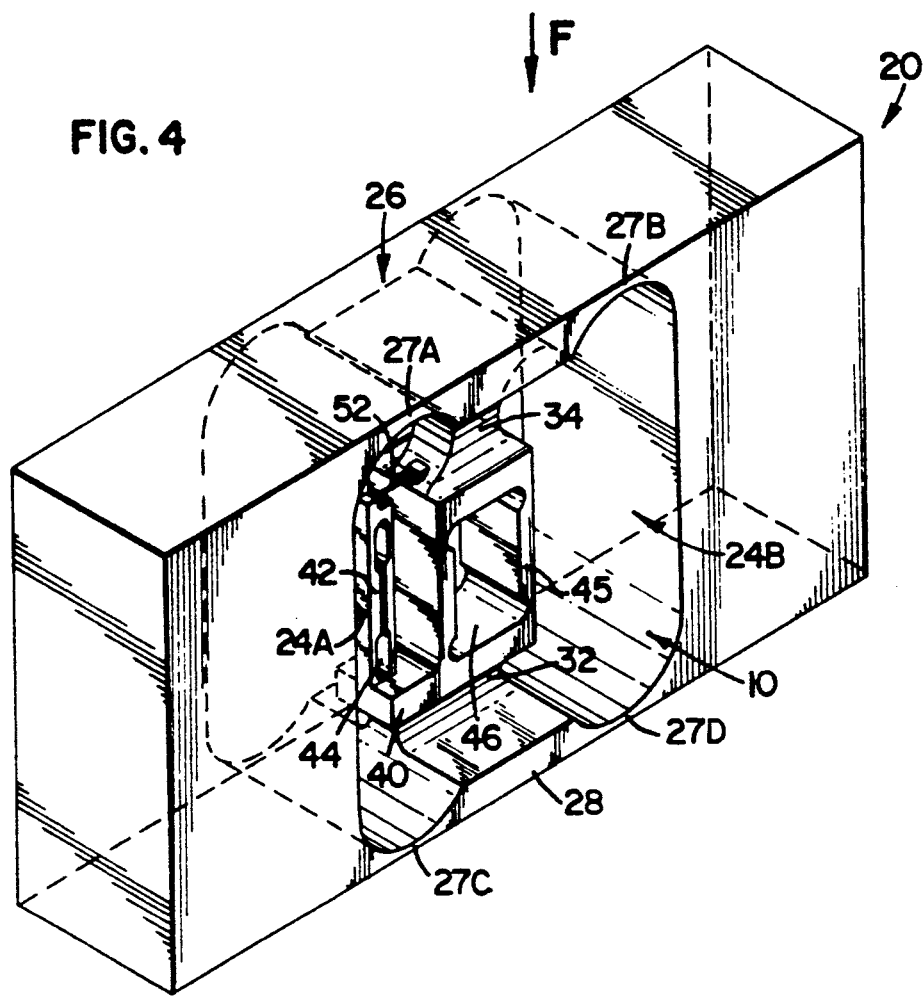
FIG. 4 is a perspective view of a load cell in accordance with an alternative embodiment of the invention.

As applied in a load cell, FIG. 4 the base 40 may be used to position cantilever capacity support beam 42 and load beam 45 in the opening 10 of the load cell structure 20. More specifically, the base 40 extends generally and is attached to interior wall 28 which forms the load cell opening 10. While not essential, the load cell base 40 may be attached to interior wall 28, or for that matter any of the other interior walls including side wall 24A, side wall 24B or upper wall 26 through any number of appendages including flexure 32.

Thus, as can be seen, the base 40 may take any number of forms including a simple rigid structure 40 as seen in FIG. 5 or for that matter the more complex platform 40 as seen in FIG. 4. The base 40 may also comprise flexures between the various beams mounted on its surface to prevent undesired or interfering movement out of the intended axis.

The load cell of the invention generally also comprises a parallel beam structure which assists in the measure of force incident to the load cell. The parallel beam structure 42 and 45 (FIGS. 4 and 5) also functions to hold the sensing means 52. Generally, the parallel beam structure may comprise any configuration of the appropriate material and dimension which will facilitate and exhibit deflection under the intended conditions.

Turning back to FIG. 5, definition of parallel beams 42 and 45 will depend on the magnitude of the force, acceleration or other movement to be sensed by the beam structure. Relevant parameters include the length of the parallel beams, the necessity of the beam in having an open insert 44 and 46, FIG. 5. Also relevant are the materials used to create the beams and the presence of flexures to attach the beams to any intended base.

Generally, the parallel beam structure may comprise any number of different configurations in accordance with the invention. One alternative embodiment of the parallel beam structure can be seen in FIG. 5 comprising parallel beams 42 and 45. In this instance, parallel beam 45 serves as a load beam, being the primary support of any mass, force, or other displacement placed in the structure. In the meantime, load beam 42 serves as means for supporting the capacity affixed to this lower beam 42. In other words, beam 42 will receive the principal force resulting from displacement. In the meantime, beam 45 serves as a load bearing element as well as an additional station to seat sensing element 52.

As can be seen in FIG. 5, interior portion 41 results from the lower side of beam 45, the upper side of beam 42, the interior side of sensing means 52, and the exterior side of base 40. Upon deflection, parallel beams 45 and 42 will move in an axis which is consistent with the direction of the displacing force. However, the exterior surface of base 40 as well as the interior surface of sensing means 52 will remain parallel to each other or in "parallelogram" configuration. The result of this parallelogram structure is the negation of a moment arm in the force sensor.

This configuration produces a load cell which is easily manufactured to provide a uniform response regardless of where force is applied generally across the surface of the parallel beams. Further, the parallel beam structure, including the close proximity of the beams to one another, provides a structure wherein changes in temperature, humidity, as well as other environmental stresses result in beams which respond similarly to one another. In essence, the invention provides a force sensor which compensates for changes in modulus and allows for any variation and deflection created by environmental stresses.

A more preferred alternative embodiment of the invention can be seen in FIG. 4 wherein load bearing member 45 is positioned parallel, within the opening of the three-dimensional structure or block, to cantilever beam 42 or the capacity supporting means. Here again, the substrate 40 has an interior plane which is parallel to the interior side of the sensor 52. At the same time, the overall configuration of cantilever beam 42 is parallel at its interior edge with the interior or opposing face of load beam 45.

While not essential, openings 44 and 46 may be defined in each of the load beams 42 and 45, respectively. These openings allow greater sensitivity to force allowing for the load beam deflection to be created by a preferred magnitude of force. In essence, openings such as those found at 44 and 46 allow for the creation of a load cell having greater sensitivity to the force incident on the cell. The openings easily bored or machined with standard tooling, and may be slotted or dumbbell-shaped.

Generally, as can be seen in FIG. 4, a load cell may take any number of configurations including that of a three-dimensional six-sided block. Within the cell, there may generally be an opening 10 defined by the two side walls 24A and 24B as well as an upper side wall 26 and a lower, side wall 28 positioned within the opening is the base 40 on which is mounted load beam 45 and cantilever capacity supporting beam 42.

Optionally, any number of elements within the load cell may be attached through the use of flexures. Flexures assist in determining the load capacity of the parallel beam structure as well as preventing the base or other structures from pivoting or bending into a plane outside that intended. Flexures are integral in converting the force sensed into displacement of the base and parallel beam structure so as to influence the sensor by a mechanical action ultimately resulting in a transduced signal from the sensor.

Generally, flexures may be positioned anywhere within the load cell to prevent interfering deflection. Specifically, as can be seen in FIG. 4, a flexure 32 may be found at the base of base 40 attaching base 40 to lower wall 28. Flexure 34 may be found at the top of load beam 45 attaching load beam 45 to upper wall 26.

Within the opening of the three-dimensional structure, sensing element 52 is supported between load bearing beam 45 and capacity supporting beam 42. Load beam 45 and cantilever support beam 42 are in parallel within at least one plane within the opening 10 of three-dimensional block 20. This maintains the parallelogram-like structure created by base 40, sensing element 52, as well as the two interior or opposing side walls of beam 42 and beam 45. Accordingly, deflection of the load cell by any force will result in a parallelogram-like response within the invention.

The sensors may be attached through means which will provide an integral or fixed and stable joint such as thermoplastic or thermosetting adhesives. One preferred class of adhesives includes epoxy-type adhesives, such as those commercially available. Preferred load cell performance may be as rigid and stable as possible. To minimize joint effects a larger deflection of the parallel spring system is desired. Then when the attachment joints move, this movement is small relative to the beam deflection. The output will then be less sensitive to a small amount of deflection due to less than perfect attachment joints.

The load cell of the invention also comprises sensing means 52, FIG. 5. The sensing means generally function to sense force created by the incidence of a force on the load cell. The sensing means is influenced by the force either of compression or tension and transduces this force into an electrical signal which is sent to a circuit for evaluation. Generally, any number of sensing means may be used in accordance with this invention including hard electrical wiring, electrical circuitry, transistor circuitry, including semiconductors and the like. Sensing means which may be used include optical, electromechanical, and impedance or resonator sensing means.

One preferred sensing element comprises an impedance or resonator such as a quartz crystal. Preferred resonators include those available from Microcrystal made by ETA of Grenchen, Switzerland. This resonator is commonly referred to as a double ended tuning fork and generally comprises two parallel tines joined together at their ends. The tines are excited piezoelectrically so as to vibrate in an amount bending them in opposition to each other within the plane of the plate. By applying a tensile or compressive force to the crystal along its longitudinal axis, its resident frequency will increase or decrease like the strings of a violin.

The quartz crystal is a very stable and reliable electromechanical device. Its force frequency response and its quasidigital output signal associated with accurate frequency measuring capabilities enable good performance. Outstanding mechanical and physical properties of single crystal quartz yield a behavior with tight repeatability and without hysteresis as well as good thermal and long term stability. Furthermore, only small displacements are induced in the mounting structure due to the high stiffness of quartz.

An oscillator is needed in order to drive the quartz resonator. Since equivalent electrical parameters of the crystal are similar to those of the widely used tuning forks, familiar pierce oscillators known to those of skill in the art are adequate for operation of the crystal. Oscillators using standard integrated amplifiers are easy to implement. A useful oscillator circuit may be supplied by 5 to 15 volts through any variety of circuit configurations known to those of skill in the art.

Preferably, the quartz crystal transducer will range in size from about 0.1 inch to 1.0 inch, and most preferably from about 0.5 inch to 0.25 inch. The frequency range of the transducer may vary depending upon the given application. However a frequency of 20 KHZ to 100 KHZ, preferably 44 KHZ, 48 KHZ, and most preferably 86 KHZ to 94 KHZ has been found most useful.

The load cell of the invention may also comprise any variety of circuitry useful in evaluating the electrical signal received from the sensing means and reflecting the appropriate magnitude of the sensed force. Generally, any circuit commensurate with this purpose which will provide a linear response to an electrical signal may be used in accordance with the invention.

Preferably, circuitry found useful with this invention are impedance circuits such as Wheatstone bridge configurations and the like, or differential circuits which cancel the bias signals of the elements within the load cell. The Wheatstone bridge uses four resistive elements arranged in a square circuit with voltage applied across two diagonal corners and the signal measures across the other diagonal corners.

Returning to FIG. 1, a more preferred embodiment of the parallel beam structure can be seen. Essentially, this embodiment of the load cell may function with two sensing elements 52A and 52B, a base 40, and adequate structure to ensure that both sensing elements will be influenced equally when the load cell is stressed. This will allow for the independent signal processing of each respective sensor producing a common mode signal effects and differential mode signal effects.

Common mode signal effects include the effects of temperature, pressure, external vibration and aging among any other effects which influence both cantilever beams 42A and 42B as well as sensors, 52A and 52B, equally, FIG. 1. Differential mode effects are most importantly any force or stress on the sensor which influences the cantilever beams 42A nd 42B as well as sensors 52A and 52B, unequally.

In this case, hollowed cantilever beams 42A, 42B and 45 are attached to a single unitary base 40 stemming from the opening lower side 28. The load cell is able to compensate for changes in the modulus of elasticity, variations and hysteresis as well as anelastic creep through attachment of both of the flexible beams 42A and 42B through sensing means 52A and 52B attached between the upper ends of the flexible beams and the stationary beam 46. In this instance, any change in modulus, hysteresis or creep will be cancelled by attaching the sensing means between both flexible arms and the stationary beam as both will be affected proportionally.

While not wishing to be bound to a specific mode or theory of operation, we believe that the load cell has a load bearing beam 45 arranged with a bridging gap to a small spring 42. This small spring 42 bears a load because of the deflection of the load bearing beam 45 by force transfer through a relatively ridged force sensor 52A or 52B deflecting only for example about 0.000005 inch at full load. In this case, the entire load cell may deflect only about 0.015 inch. The force sensor then experiences a force which is independent of the elastic modulus of the machining material.

In this case, where P is load, the total load born by the parallel springs is:

$$P_T = P_1 + P_2$$

where $P_1$ is the load born by beams 45 and $P_2$ is the load born by spring 42.

The load on each beam is proportional to its deflection:

$$P_1 = K_1 Y_1 \text{ and } P_2 = K_2 Y_2$$

where $Y_1$ and $Y_2$ are respective deflections in inches, $K_1$ and $K_2$ are respective spring constants representing pounds of load per inch of deflection.

If the connecting force sensor has a very high spring constant then the two beams have nearly equal deflection under load.

$$Y_1 = Y_2 \text{ and } \frac{P_1}{K_1} = \frac{P_2}{K_2}$$

The spring constant of each beam is proportional to the modulus of its material of composition:

$$K_1 = C_1 E_1 \text{ and } K_2 = C_2 E_2$$

where $C_1$ and $C_2$ are constants dependent on the beam shape and $E_1$ and $E_2$ are their respective elastic moduli.

Because the material of both springs is the same, their moduli are the same.

$$E_1 = E_2$$

and $$\frac{P_1}{C_1 E_1} = \frac{P_2}{C_2 E_1}$$

The force on $P_2$ is equal to the force on the force sensor because the force sensor is the connecting element. Therefore the sensed force is proportional to the applied load.

$$P_2 = \frac{P_1 C_1}{C_1} = (P_T - P_2) \times \frac{C_2}{C_1}$$

and $$P_2 = \frac{P_T}{(1 + C_2/C_1)}$$

$C_2$ and $C_1$ are dimensional factors so $P_2$ is directly dependent on the applied force without substantial modulus effects.

Therefore, modulus sensitivity to temperature, anelastic creep (a time dependent modulus effect) and static hysteresis (an internal material friction effect which creates a history dependence on modulus) become negligible if the structures in both springs see similar environmental effects and stress levels if a non-linear stress-strain relationship exists.

The output signal of these load cells is almost purely dependent on their structural dimensions and the applied load, if temperature does not effect the force sensor's performance. When the load cell is not made from the same material as the force sensor, temperature changes will cause a change in the force sensors signal in the form of a zero shift. Other environmental effects such as barometric pressure may also cause similar effects on the zero stability. To overcome these environmental effects a closely matched second force sensor is generally preferred. The second force sensor 52B may be mounted between the load beam 45 and another parallel beam 42B. This force sensor will then see a negative force as compared to the first sensor 54A. By extracting the difference between the two force sensors, the output due to the applied force is doubled, but interference effects which affect both sensors 52A and 52B equally cancel.

APPLICATIONS

The claimed invention may be used in any bending beam configuration. The beams may be attached rigidly to a substrate or levered by a fulcrum or mixed, fixed or supported fulcrum systems. The load cell may be subjected to compressive or tension forces or both through stress on the load cell. In systems with two or more beams, where the invention is affixed between the beams, the beams may both be of fixed attachment to the substrate. Alternatively, one beam may be of fixed attachment to the substrate with the other beams fixedly attached to the first beam.

The invention may also be used in multiple beam systems, which do not provide a rigid attachment of the beams to the substrate. In this application, for example, multiple parallel beams may be positioned or suspended beneath a substrate, with the claimed load cell placed in line between the beam and the substrate. Such an application might be seen in single point scales such as scales used to weigh produce, livestock and the like.

The invention may also be used to measure objects of great mass such as trucks, or large structures such as houses or buildings. In this case, the beam would be fixed upon two fulcrums positioned at either end of the beam with the claimed cell attached at a joint along the beam. When stressed, the claimed invention senses the forces required to deflect the sensing beam.

Further, the claimed invention may be used in multiple fulcrum systems such as deflecting plates which are attached rigidly at one or more edges, or levered by fulcrums.

The claimed invention may be used between two axially loaded springs such as in coiled suspension spring applications. These types of systems may be seen in vehicle support applications or vibration isolation systems, e.g. shock absorbance. In these applications, the force to be evaluated may be sensed independent of interference and in environments where the force is constantly changing in magnitude.

In suspension systems, such as those which deflect when stressed, the claimed invention may be used with multiple springs which through axial movement provide compressive and tensile action on a load cell placed vertically in line with springs which are positioned at an angle with respect to the line between the load and substrate. By positioning a load cell between two sets of springs, chains or other flexible elements, load bearing mechanisms may be used to sense force in large scale applications such as suspended hoists.

The invention may also be used to sense measure or sense variations in pressure. Either absolute or differential pressure may be measured by positioning the claimed load cell in line between two platforms, each platform being affixed to a containing spring system, such as bellows. In an absolute pressure system, for example, the load cell may be subjected to compressive forces created by an expanding bellows and a supportive or reactive bellows which are not pressure sensitive but merely track or gauge displacement.

In differential pressure measurement, the load cell of the invention may be positioned in line with opposing bellows or diaphragms, which are in turn positioned between opposing fluid ports. In summation, pressure measurement, the load cell of the invention may be placed in line between two opposing fluid sources.

The invention may be used to sense momentary variations in acceleration, such as laboratory applications such as non-repeatable experiments where any effects created by hysteresis are to be eliminated. For example, destructive testing (e.g. automobile crash tests), explosives testing and the like are all applications which may use a system having a mass attached outside of, or between, two load bearing elements with the load cell of the invention also attached between the load bearing elements.

Torsion or moment sensing may also be accomplished by the load cell of the invention. In applications such as vehicle axles, motor output, and the like (any movement which will create torque), the relative force may be sensed by the load the cell of the invention by attaching the load cell between the torque creating element and an axially aligned reactive torsion element.

Any number of other applications such as torsional bending and the like may be possible with the invention. The design of the load cell has been found to provide great variability in application and design through any number of mechanisms where the sensing of force absent material effects or environmental interferences is desired.

The above discussion, examples and embodiments illustrate our current understanding of the invention. However, since many variations of the invention can be made without departing from the spirit and scope of the invention, the invention resides wholly in the claims hereafter appended.

I claim as my invention:

1. A force sensing load cell comprising:

(a) a block comprising an interior wall defining an aperture therein, said interior wall comprising a base;

(b) a load bearing element having first and second ends, said load bearing element affixed to said base at said first end, said load bearing element being affixed at said second end to said interior wall and spanning across said aperture, said load bearing element comprising a cantilever beam;

(c) a capacity supporting cantilever beam, said cantilever beam spaced apart from, and parallel in at least one plane to, said load bearing element; and (d) means for sensing force, said force sensing means affixed between said load bearing element and said capacity supporting cantilever beam in a manner which rejects frictional movement whereby, when stressed, the parallel deflection of said load bearing element and said capacity supporting cantilever beam of said load cell compensates for changes in modulus and allows for variation in deflection created by environment stresses.

2. The load cell of claim 1 wherein said load bearing element and said capacity supporting cantilever beam have central openings within their structure.

3. The load cell of claim 1 wherein said base and said force sensing means are joined through said load bearing element and said capacity supporting cantilever beam to form a square central opening, wherein at least said base and said force sensing means lie opposite and parallel to each other.

4. The load cell of claim 1 wherein said sensing means comprises a piezoelectric resonator secured to said load bearing element and said capacity supporting cantilever beam by an adhesive.

5. The load cell of claim 1 wherein said sensing means comprises a piezoelectric quartz resonator comprising a first tine and a second tine lying parallel to each other and attached at their ends.

6. The load cell of claim 1, wherein said load bearing element is arranged to span across said aperture in an axis generally parallel to an axis of deflection of said load cell due to applied force.

7. The load cell of claim 1, wherein said load cell base extends into said aperture from said interior wall.

8. A force sensing load cell comprising:
(a) a three-dimensional structure having an interior opening defined by an upper wall, a lower wall, and first and second side walls;
(b) a base affixed to at least one wall within the interior opening of said three-dimensional structure;
(c) a load bearing element having first and second ends, wherein said load bearing element is affixed to said base at said first end and to at least one wall of said three-dimensional structure interior opening at said load bearing element second end such that said load bearing element spans across said interior opening;
(d) a capacity supporting cantilever beam, said cantilever beam affixed to said base, and spaced apart from, and parallel in at least one plane to, said load bearing element; and
(e) means for sensing force, said force sensing means affixed between said load bearing element and said capacity supporting means.

9. The load cell of claim 8 wherein said base is attached within said interior opening through a flexure to said interior opening lower wall.

10. The load cell of claim 8 wherein said load bearing element and said capacity supporting cantilever beam have central openings within their structure.

11. The load cell of claim 8 wherein said base and said sensing means are joined through said load bearing element and said capacity supporting cantilever beam to form a square central opening, wherein at least said base and said sensing means lie opposite and parallel to each other.

12. The load cell of claim 8 wherein said sensing means comprises a piezoelectric resonator secured to said load bearing element and said cantilever beam by an adhesive.

13. The load cell of claim 8 wherein said sensing means comprises a piezoelectric quartz resonator comprising a first tine and a second tine, said first and second tines lying parallel to each other, and connected at either end.

14. The load cell of claim 8 wherein said base is affixed to said interior opening lower wall, and wherein said load bearing element comprises a beam attached to said base and spanning from said base to said upper wall generally parallel to said first and second side walls.

15. A force sensing load cell comprising:
(a) a three-dimensional structure having an interior opening defined by an upper wall and a lower wall joined by first and second side walls;
(b) a base positioned within said interior opening and affixed to at least one of said interior opening walls;
(c) a first capacity supporting cantilever beam, said first capacity supporting cantilever beam affixed to said base and extending within the plane of said three-dimensional structure interior opening;
(d) a second capacity supporting cantilever beam, affixed to said base and spaced apart from, and parallel in at least one plane to, said first capacity supporting cantilever beam, said second capacity supporting cantilever beam also extending within said three-dimensional structure interior opening;
(e) a load beam having first and second ends, said load beam affixed to said base at said load beam first end and parallel, in at least one plane to, said first capacity supporting cantilever beam and said second capacity supporting cantilever beam, said load beam spaced apart from and positioned intermediate between both of said first and second capacity supporting cantilever beams, and wherein said load beam spans across said interior opening and is affixed at said second end to at least one of said interior opening walls;
(f) a first means for sensing displacement, said displacement sensing means affixed between said first capacity supporting cantilever beam and said load beam; and
(g) a second means for sensing displacement, said second displacement sensing means affixed between said load beam and said second capacity supporting cantilever beam, whereby stressing said load cell through the incidence of a force provides independent signal processing of said first and second sensor means producing a common mode signal separate from a differential mode signal.

16. The load cell of claim 15 additionally comprising circuit means for receipt and processing of said common mode and said differential mode signals.

17. The load cell of claim 15 wherein said base is affixed to said interior opening lower wall by a flexure.

18. The load cell of claim 17 wherein said load beam is affixed at said second end to said interior opening upper wall by a flexure.

19. The load cell of claim 15 wherein said three-dimensional structure upper and lower walls each comprise flexures at the joining points of said first and second side walls.

20. A force sensing load cell, comprising:
(a) a block having an interior opening defined by an upper wall and a lower wall joined by first and second side walls, wherein said block comprises:
   (i) a base attached to said block interior opening lower wall;
   (ii) a load beam spanning across said interior opening and having first and second ends, wherein said load beam first end is attached to said base and said load beam second end is attached to said block interior opening upper wall; and
   (iii) a capacity supporting cantilever beam attached to said base and oriented generally parallel to said load beam, wherein said capacity supporting cantilever beam is spaced apart from said load beam; and
(b) a quartz resonator, affixed between said load beam and said capacity supporting cantilever beam wherein said base and said quartz resonator are joined through said load beam and said capacity supporting cantilever beam to form an opening, and wherein said base and said quartz resonator lie opposite and parallel to each other.

21. The load cell of claim 20, wherein said block is formed as a monolithic structure.

22. The load cell of claim 20, wherein said quartz resonator is affixed to said load bearing beam and said capacity supporting beam by an epoxy adhesive.

23. The load cell of claim 20, wherein said quartz resonator is a crystal quartz double-ended tuning fork.

24. A force sensing load cell, comprising:
(a) a block having an interior opening defined by an upper wall and a lower wall joined by first and second side walls, wherein said block comprises:
   (i) a base attached to said block interior opening lower wall;
   (ii) a load beam spanning across said interior opening and having first and second ends, wherein said load beam first end is attached to said base and said load beam second end is attached to said block interior opening upper wall;
   (iii) a first capacity supporting cantilever beam attached to said base and oriented generally parallel to said load beam, wherein said first capacity supporting cantilever beam is spaced apart from said load beam; and
   (iv) a second capacity supporting cantilever beam attached to said base and oriented generally parallel to said load beam such that said load beam is intermediate said first and second capacity supporting cantilever beams, wherein said second capacity supporting cantilever beam is spaced apart from said load bearing beam;
(b) a first quartz resonator affixed between said load bearing beam and said first capacity supporting cantilever beam wherein said base and said first quartz resonator are joined through said load beam and said capacity supporting cantilever beam to form an opening, and wherein said base and said first quartz resonator lie opposite and parallel to each other; and
(c) a second quartz resonator affixed between said load bearing beam and said second capacity supporting cantilever beam wherein said base and said second quartz resonator are joined through said load beam and said second capacity supporting cantilever beam to form an opening, and wherein said base and said second quartz resonator lie opposite to and parallel to each other.

25. The load cell of claim 24, wherein said block is formed as a monolithic structure.

26. The load cell of claim 24, wherein said first and second quartz resonators are affixed to said load bearing beam and said first and second capacity supporting beams, respectively, by epoxy adhesive.

27. The load cell of claim 24, wherein said first and second quartz resonators are crystal quartz double-ended tuning forks.

28. A force sensing load cell comprising:
(a) a block having an aperture therein;
(b) a load bearing spring, said load bearing spring spanning said block aperture;
(c) a capacity supporting spring, said capacity supporting spring positioned parallel to said load bearing spring within said block aperture; and
(d) means for sensing force, said force sensing means affixed between said load bearing spring and said capacity movement whereby, when stressed, the parallel deflection of said load bearing spring and said capacity supporting spring of said load cell compensate for changes in modulus and allows for variation in deflection created by environmental stresses.

* * * * *